US006826843B2

United States Patent
Lam et al.

(10) Patent No.: US 6,826,843 B2
(45) Date of Patent: Dec. 7, 2004

(54) ELECTRONIC COMPASS APPARATUS AND METHOD

(75) Inventors: Vincent M. T. Lam, Sheung Shui (HK); Alan M. L. Lam, Tai Po (HK); Raymond C. C. Ho, Tsuen Wan (HK)

(73) Assignee: RadioShack, Corp., Fort Worth, TX (US)

( * ) Notice: Subject to any disclaimer, the term of this patent is extended or adjusted under 35 U.S.C. 154(b) by 0 days.

(21) Appl. No.: 10/304,320

(22) Filed: Nov. 25, 2002

(65) Prior Publication Data

US 2004/0098873 A1 May 27, 2004

(51) Int. Cl.$^7$ .............................................. G01C 17/26
(52) U.S. Cl. .................. 33/363 R; 33/355 R; 33/1 PT; 33/363 K
(58) Field of Search ........................ 33/355 R, 363 R, 33/363 K, 1 N, 1 PT, 363 L, 363 N, 363 Q, 363 Y

(56) References Cited

U.S. PATENT DOCUMENTS

| | | | | | |
|---|---|---|---|---|---|
| 3,888,016 A | * | 6/1975 | Fowler | .................. | 33/346 |
| 4,053,985 A | * | 10/1977 | Spentzas | ................ | 33/1 N |
| 4,117,602 A | | 10/1978 | Lapeyre | | |
| 4,316,081 A | * | 2/1982 | Washizuka et al. | ........... | 33/762 |
| 4,414,754 A | * | 11/1983 | Lapeyre | .................... | 33/363 K |
| 4,668,100 A | * | 5/1987 | Murakami et al. | ............ | 33/361 |
| 4,694,583 A | * | 9/1987 | Blaney | ........................ | 33/361 |
| 4,779,211 A | * | 10/1988 | March | ......................... | 33/763 |
| 4,905,377 A | * | 3/1990 | Martinez et al. | .............. | 33/333 |
| 5,001,682 A | * | 3/1991 | Anderson | .................... | 33/398 |
| 5,560,114 A | * | 10/1996 | Lahteenmaki | ................ | 33/356 |
| 5,669,148 A | * | 9/1997 | McDermott | ............... | 33/355 R |
| 5,752,322 A | * | 5/1998 | Lewis | ...................... | 33/355 R |
| 5,755,036 A | * | 5/1998 | Lewis | ...................... | 33/355 R |
| 6,310,549 B1 | * | 10/2001 | Loftin et al. | ................ | 340/547 |
| 6,583,750 B2 | * | 6/2003 | Shin | ............................ | 342/20 |
| 2002/0139855 A1 | * | 10/2002 | Dvorkis et al. | ........ | 235/462.01 |

* cited by examiner

Primary Examiner—Diego Gutierrez
Assistant Examiner—Yaritza Guadalupe
(74) Attorney, Agent, or Firm—Dan Brown Law Office; Daniel R. Brown

(57) ABSTRACT

An apparatus and method for determining the orientation of Earth's magnetic poles. A magnet is pivotally coupled to a support and is free to orient itself with Earth's magnetic pole. A detector is fixed relative to the support and outputs a signal indicative of the magnet orientation. A display displays an indication of the relative orientation of Earth's magnetic pole consistent with the output signal. Plural detectors can be employed to increase resolution of the apparatus. The detectors can be optical detectors. A shutter is fixed to the magnet and the detectors sense the shutter position. The shutter has a patterned formed thereon with transmissive portions and opaque portions. Shutter blinds are added to limit the dispersion of light.

20 Claims, 4 Drawing Sheets

ELECTRONIC COMPASS APPARATUS AND METHOD

BACKGROUND OF THE INVENTION

1. Field of the Invention

The present invention relates to compasses. More specifically, the present invention relates to electronic digital compass apparatus and methods that employ a conventional magnetic compass as a directional reference.

2. Description of the Related Art

The conventional magnetic compass was invented hundreds of years ago and has been in wide use ever since. A magnetic compass is based upon a lightweight magnet supported on a nearly frictionless pivot. In operation, the magnet aligns itself with the magnetic poles of Earth. The magnet is generally referred to as the needle of the compass, and the needle is generally enclosed in some form of housing to protect it from the environment. The movement of the needle may be damped in some fashion, such as by filling the housing with a liquid. To aid in direction finding and navigation, the compass housing is frequently marked with the traditional compass rose points, including the cardinal bearing points. The housing may include azimuth angles, referenced as 0 degrees north and incrementing in a clockwise direction through 360 degrees. In addition, a declination adjustment setting may be present to provide easy correction for the variation between magnetic north and true north. The conventional compass has several advantages including simplicity of design, low cost, familiarity to users, lack of calibration requirement, and lack of need for a power source or battery. The conventional compass also has some disadvantages. Many users find it difficult to calculate and interpret a course heading from the simple north-south pointing needle. This is particularly true in complex navigation tasks such as multiple segment courses and backtracking tasks.

Technological advancements have addressed some of the issues present in conventional compasses with the recent advent of electronic digital compasses. Digital compasses have heretofore utilized solid state magnetic sensors or integrated circuits responsive to the Earth's magnetic fields. The outputs of such solid state sensors are coupled to a processor or controller that interprets the information and combines it with application software to drive a digital display. The display presents a magnetic heading to the user of such a device. Once the basic digital compass hardware structure of solid state sensors, a controller and a display were in place, designers then added numerous enhancements through use of software applications. For example, modern digital compasses provide features such as a programmable compass rose mode, reading and heading memory and storage, cardinal point readout in character form, declination adjustment, and heading direction indication. All of these features make the use of a digital compass more convenient than a conventional compass.

The basic trade-off between conventional compasses and digital compasses is cost. In order to acquire the advantages of a digital compass, users are required to spend more than what a conventional compass would cost. An analysis of the cost of components in a digital compass indicates that most of the components are relatively inexpensive. Microprocessors, displays, discrete circuit components, circuit boards, and the housing itself have all become rather inexpensive due to the economies of scale and the general advancements in materials and production. In fact, the sum cost of these components have dropped to very a reasonable levels. The reduction of cost of digital compasses to a level competitive with convention compasses is limited by the cost of the essential solid state magnetic sensing devices. The sensing devices remain too expensive to allow product costs to drop to the competitive level. Thus there is a need in the art for an alternative digital compass apparatus and method, which eliminates the need to employ solid state magnetic field sensing devices so as to reduce cost of the device while retaining the features and benefits that are provided through the use of all digital technology.

SUMMARY OF THE INVENTION

The need in the art is addressed by the apparatus and methods of the present invention. An apparatus for determining the orientation of Earth's magnetic pole is taught. The apparatus includes a magnet that is pivotally coupled to a support and that is free to orient itself with Earth's magnetic pole. It also includes a detector that is fixed relative to the support, and that has an output signal indicative of the orientation of the magnet. A display is coupled to the sensor to display an indication of the relative orientation of Earth's magnetic pole consistent with the output signal.

In a specific embodiment of the present invention, the detector includes plural detectors positioned about the path of movement of the pivotally coupled magnet. The detector may be an optical detector. In a particular embodiment, the detector is an optical pair detector having a light emitter and a light sensor positioned to detect the orientation of the magnet. In another specific embodiment, the apparatus further includes a shutter fixed to the magnet, and the detector is an optical detector responsive to the orientation of the shutter. The optical detector may include plural optical detectors positioned about the shutter. In a refinement of the invention, the shutter has an optical pattern formed thereon and the plural optical detectors change the output signal responsive to the optical pattern. The optical pattern may include a transmissive portion and an opaque portion, or it may include a reflective portion and an absorptive portion. In one embodiment, the optical pattern is arranged with respect to the plural optical detector positions such that any single incremental change in the magnet orientation results in a change of state of the output signal caused by one of the plural optical detectors only. In a particular embodiment, the optical pattern is formed as plural arcuate portions, each concentric with the pivotal coupling, and each of the plural optical detectors lies along one of the arcs proscribed by the plural arcuate portions of the pattern.

In a particular embodiment, each of the optical sensors includes a light emitter and a light sensor positioned on opposite sides of the shutter. To improve performance, an emitter blind is positioned between the plurality of light emitters and the shutter. The emitter blind has a plurality of apertures formed therein, and each aperture is aligned with one of the plurality of light emitters. In another approach, a sensor blind is positioned between the plurality of light sensors and the shutter. The sensor blind also has a plurality of apertures formed therein, and each aperture is aligned with one of the plurality of light sensors. The light emitters may be light emitting diodes. The light sensors may be photo-diodes, photo-transistors, or light emitting diodes.

The present invention also teaches an electronic compass embodiment. The electronic compass includes a housing with a magnet pivotally coupled thereto, and that is free to orient itself with Earth's magnetic pole. A shutter is fixed to the magnet and the shutter has an optical pattern formed thereon. The optical pattern has plural arcuate opaque portions, each concentric with the pivotal coupling, and a transmissive portion. Plural light emitters and plural light sensor are arranged as pairs and are fixed to the housing on opposite sides of the shutter. Each pair lies along one of the arcs proscribed by the plural arcuate portions. Each of the plural light sensors produces an output signal that is responsive to the optical pattern opaque portion or transmissive portion. To improve performance, an emitter blind is positioned between the plurality of light emitters and the shutter, and has a plurality of apertures formed therein. Each of the apertures is aligned with one of the plurality of light emitters. Also, a sensor blind is positioned between the plurality of light sensors and the shutter. It also has a plurality of apertures formed therein, and each aperture is aligned with one of the plurality of light sensors. A display is coupled to display an indication of the relative orientation of Earth's magnetic pole consistent with the output signals received from the plural light sensors.

The present invention also teaches a method of determining the orientation of Earth's magnetic pole. This method is accomplished with a device that has a housing and a magnet that is pivotally coupled thereto, a detector fixed relative to the housing, and a display. The steps of the method include orienting the magnetic poles of the magnet with Earth's magnetic poles and detecting the orientation of the magnet with respect to the housing by the detector. Finally, displaying an indication of the relative orientation of Earth's magnetic pole in accordance with the output of the detector.

In a specific embodiment of the method, the detector includes plural detectors positioned about the path of movement of the magnet. The detector may be an optical detector. In a refinement of the method, the device includes a shutter fixed to the magnet and the detector is an optical detector, and the detecting step is accomplished by optically detecting the orientation of the shutter. In another refinement, the shutter has an optical pattern formed thereon and the detector includes plural optical detectors. The detecting step then includes the further step of determining the orientation of the magnet by reading the output states of the plural optical sensors. The optical pattern may include a transmissive portion and an opaque portion, or it may include a reflective portion and an absorptive portion. In a specific embodiment, the optical pattern is arranged with respect to the plural optical detector positions such that any single incremental change in the magnet orientation results in a change of state in only one of the plural optical detectors. In a refinement of the method, the optical pattern is formed as plural arcuate portions, each concentric with the pivotal coupling, and each of the plural optical detectors lies along an arc proscribed by one of the plural arcuate portions. The determining step may include the step of reading the output of the plural optical sensors simultaneously or sequentially.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention enables the provision of all the features and capability of fully digital compasses without the cost burden of discrete solid state or integrated circuit magnetic field sensing elements. This is accomplished by employing a conventional mechanical compass as the core direction reference in an otherwise electronic compass. This approach allows the implementation of features such as a digital display, programmable compass rose modes, reading storage, cardinal point readout in character form, declination angle adjustment, heading direction indication, and other features known to those skilled in the art. The conversion of the conventional compass needle's physical location to digital data is achieved using a position detector to produce a signal indicative of the relative position of the needle. The needle orientation digital data may be processed by a controller, which drives an electronic digital display to output various kinds of information based on the magnetic needle directional reference.

In an illustrative embodiment, an optical-electrical approach to needle orientation sensing is applied. As compared to the prior art digital compasses, the magnetic field sensing integrated circuit is replaced by a free-floating magnetic needle. A light shutter is fixed to the needle and rotates therewith. The light shutter consists of a disc of transparent material that has a light-blocking pattern formed thereon. Aligned pairs of light emitting diodes are employed about the shutter as emitting and detecting elements to determine the orientation of the light blocking pattern as it rotates with the needle. Light emitting diodes are used as detecting elements by applying a reverse bias voltage across the semiconductor junction and then amplifying changes in the junction voltage as the emitting diode's light strikes the junction. Because conventional magnetic needle compasses and ordinary light emitting diodes are inexpensive, the overall cost of the present invention electronic compass is significantly reduced. As a result, the present invention electronic compass preserves all of the user-friendly features known in prior art digital compass, while also benefiting from the advantages of mechanical compass designs, including lower cost and the lack of need for periodic calibration.

Figure 1:
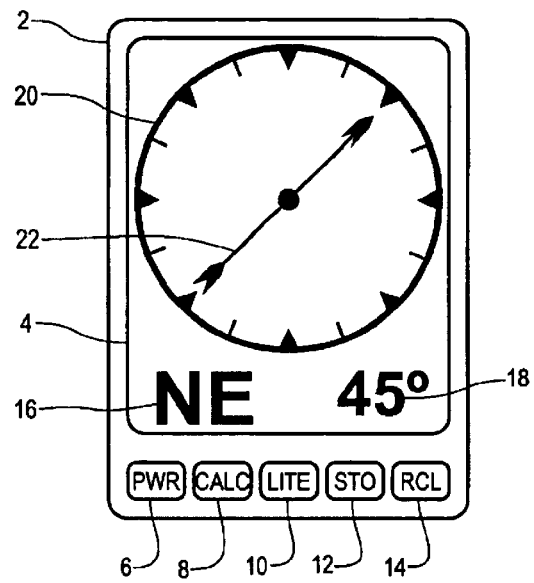
FIG. 1 is a drawing of an electronic compass according to an illustrative embodiment of the present invention.

Reference is directed to FIG. 1, which is a drawing of an electronic compass 2 according to an illustrative embodiment of the present invention. The electronic compass 2 includes a liquid crystal display 4. The display 4 displays a compass rose 20 that includes the cardinal points, North, East, South, and West, as well sixteen rose headings commonly employed, specifically N, NNE, NE, ENE, E, ESE, SE, SSE, S, SSW, SW, WSW, W, WNW, NW, and NNW. An alphabetical display "NE" 16 of the present heading is displayed, as well as the azimuth angle "45°" 18. Those skilled in the art will appreciate that all of the various display formats applied in prior art digital compasses are suitable for use with the present invention. Several key actuators are disposed on the front of the compass. A power key 6 is used to turn-on and activate the compass 2. A backlight button 10 is used to illuminate the display 4 in low ambient light conditions. A store button 12 and a recall button 14 are used to store and recall direction headings made from time to time. A calculate button 8 is used for various functions, including determining a course change between two heading readings. Those skilled in the art will appreciate that all the actuator designations and operational functions applied to prior art digital compasses are equally applicable to the present invention.

Figure 2:
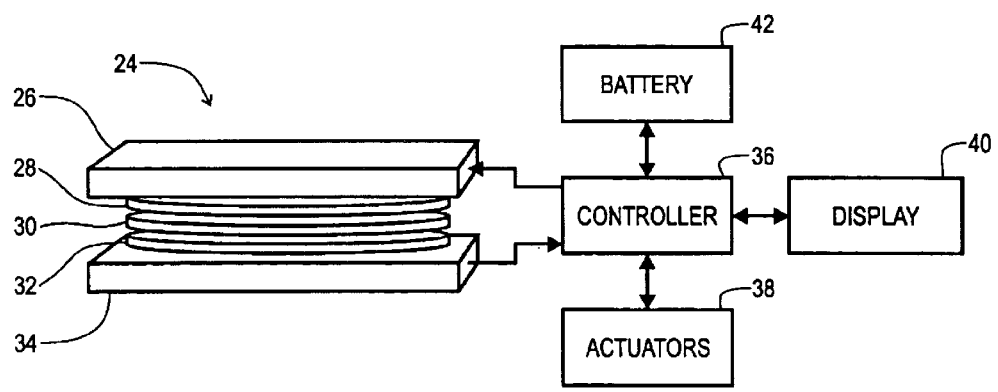
FIG. 2 is a functional block diagram of an electronic compass according to an illustrative embodiment of the present invention.

Reference is directed to FIG. 2, which is a functional block diagram of an electronic compass according to an illustrative embodiment of the present invention. A compass direction sensing unit 24 is coupled to a controller 36. The controller 36 may be any of those processors, microprocessors, controllers, micro-controllers, signal processors, integrated control devices or other control devices that are presently known or later become available, and are known to be useful in dedicated control applications by those skilled in the art. A battery 42 supplies operational power to the controller 36 and other circuit components within the digital compass. A display 40 is coupled to and driven by controller 40. The display 40 operates to display heading information. Plural key actuators 38 are coupled to the controller 36 and are used to manipulate the various features of the compass. The operational capabilities and features of the compass are embodied in software that is stored in a memory that is internal to the controller 36. In operation, the controller executes the software.

The direction sensing unit 24 of FIG. 2 consists of a compass needle and light shutter assembly 30 that is sandwiched between a light emitter assembly 26 and a light detector assembly 24. The compass assembly 30 is pivotally supported and rotates in orientation with Earth's magnetic poles. The light emitter 26 and light detector 24 sense the position of the shutter and output signals to the controller 36. The controller interprets the signals to determine the relative position of the compass heading. In addition, a light emitter blind 28 is positioned between the light emitter assembly 26 and the compass assembly 30 to limit the dispersion of the emitted light into the instrument. This serves to reduce noise and make the instrument more sensitive. Similarly, a light detector blind 32 is positioned between the compass assembly 30 and the light detector assembly 34 to further limit the dispersion of light within the instrument.

Figure 3:
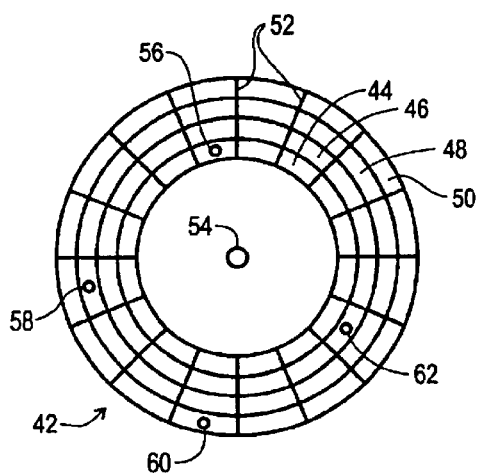
FIG. 3 is a compass shutter orientation diagram according to an illustrative embodiment of the present invention.

Reference is directed to FIG. 3, which is a compass shutter orientation diagram according to an illustrative embodiment of the present invention. A shutter wheel 42 is illustrated with subdivided areas delineated by sixteen radial segments 52. No shutter pattern has been placed on the shutter wheel 42 in FIG. 3. In the illustrative embodiment, there are four pairs of optical sensors, each comprised of a light emitter and a light detector. Since the decoding of information is binary, there are sixteen possible combinations of sensor output signals, and therefore, the compass rose is subdivided into sixteen segments. Each segment corresponds to one direction on the aforementioned compass rose. The compass shutter wheel 42 rotates about the same pivot point 54 as the magnet needle. There are four circular paths defined 44, 46, 48, and 50, that are concentric with the pivot point 54. Each circular path is radially separated from the others. The locations of the four optical sensors 56, 58, 60, and 62 are illustrated in FIG. 3. While it would be useful to locate the four optical sensors along a single radius of the shutter wheel, in the illustrative embodiment, they are spaced about the circle within one of the sixteen segments described above. The purpose for such spacing will be more fully described hereinafter. With respect to FIG. 3, note that there are sixteen arcuate segments, each with four concentric paths 44, 46, 48, and 50 aligned with the position of the arc defined by the radial position of each of the four optical sensors 56, 58, 60, and 62, respectively.

Figure 4B:
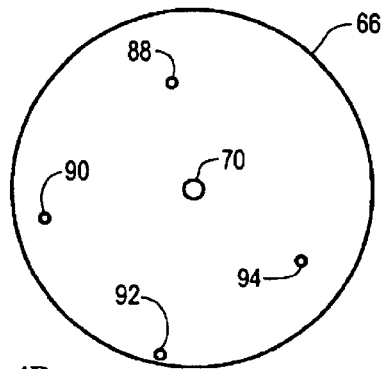
FIG. 4B is a drawing of a light emitter blind according to an illustrative embodiment of the present invention.
Figure 4C:
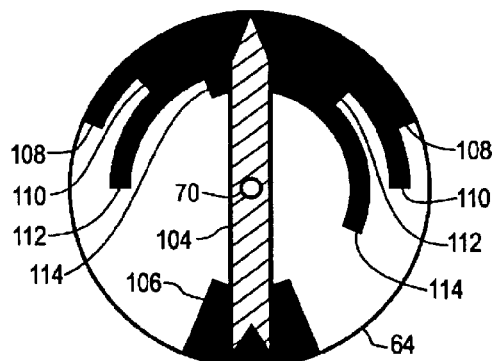
FIG. 4C is a drawing of a compass shutter wheel according to an illustrative embodiment of the present invention.
Figure 4A:
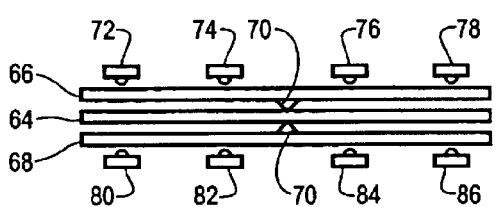
FIG. 4A is a side view of a compass direction sensing assembly according to an illustrative embodiment of the present invention.

Reference is directed to FIG. 4A, which is a side view of a compass direction sensing assembly according to an illustrative embodiment of the present invention. A compass shutter wheel 64 is pivotally supported 70, and is free to rotate and orient itself with Earth's magnetic poles. Four light emitters 72, 74, 76, and 78 are aligned on the opposite side of the compass shutter wheel 64 from four corresponding light detectors 80, 82, 84, and 86. An emitter blind 66 is disposed between the compass shutter wheel 64 and the four light emitters 72, 74, 76, and 78. Similarly, a detector blind 68 is disposed between the compass shutter wheel 64 and the four light detectors 80, 82, 84, and 86. The structure and function of the emitter blind 66 and detector blind 68 will be described hereinafter.

Figure 4D:
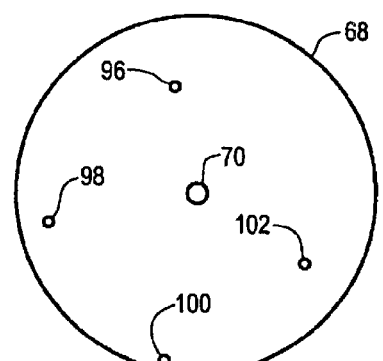
FIG. 4D is a drawing of a light detector blind according to an illustrative embodiment of the present invention.

Reference is directed to FIG. 4B, which is a drawing of a light emitter blind 66 according to an illustrative embodiment of the present invention. The emitter blind 66 is fabricated from an opaque material. The emitter blind provides a point of support 70 for the pivotal mounting point 70 of the compass shutter wheel. Four apertures 88, 90, 92, and 94 are formed in the emitter blind 66 at locations aligned with the location of the four light emitters 72, 74, 76, and 78. The four apertures 88, 90, 92, and 94 thereby limit the direction in which the emitted light may radiate. This is beneficial because the light might otherwise diffuse through the shutter 64 and cause false readings or reduced sensitivity of the apparatus. FIG. 4D illustrates the detector blind 68. The detector blind 68 is also fabricated from an opaque material. The emitter blind provides a point of support 70 for the pivotal mounting point 70 of the compass shutter wheel. Four apertures 96, 98, 100, and 102 are formed in the detector blind 68 at locations aligned with the location of the four light detectors 80, 82, 84, and 86. The four apertures 96, 98, 100, and 102 thereby limit the direction from which the detected light may enter the detectors 80, 82, 84, and 86. The combination of the emitter blind 66 and detector blind 68 shield the optical system so that all of the sensors may be operated at one time, without the need for more complex or expensive optical lens and components to focus and collimate the light. Alternatively, the optical detectors could be activated and read sequentially, obviating the need for the blinds 66 and 68.

Reference is directed to FIG. 4C is a drawing of a compass shutter wheel 64 according to an illustrative embodiment of the present invention. The shutter wheel 64 and the compass magnet needle 104 are fixed and rotate together about pivot point 70. As the shutter wheel 64 rotates, the shutter patterns 106, 108, 110, 112, and 114 move between the optical sensors and alter the transmittance of light from emitter to detector. In the illustrative embodiment, the shutter wheel is fabricated from an optically transparent material and the shutter patterns are opaque material disposed upon the shutter wheel 64. Note that the magnet needle 104 is also opaque. The patterns are selected so that the top two of sixteen segments and bottom two of sixteen segments (as viewed in FIG. 4C) do not require any transparent portions along the four sensor arcs in order to accurately decode all sixteen segment positions. This is necessary so that the magnet needle 104 will not interfere with the decoding process. The shutter pattern 106 blocks light in two segment for all four detectors 80, 82, 84, and 86. The outer most pattern arc 108 blocks light from sensor at location 60. The subsequent pattern arcs 110, 112, and 114 block light from the sensors at positions 58, 62, and 56 respectively. Note that these positions align with correspond shutter blind apertures.

The specification of the shutter pattern is made to enhance performance of the system and to hold cost to a minimum. There are three guidelines applied in specifying a suitable shutter pattern. The light emitter locations are specified first. This is because the shutter pattern will be adjusted to suit the light emitter location. Emitter location selection will be discussed hereinafter. One goal in the emitter-detector location and shutter pattern design is that any single incremental change in compass angle should cause the change of state of only one emitter-detector pair. This should apply whether the change of direction is clockwise or counter-clockwise. The output signal state for a four-bit system, such as the illustrative embodiment system, can produce sixteen output states ranging from binary "0000" to binary "1111". The total rotation of the compass wheel is 360°, so each arc segment is 22.5°. Thus, any 22.5° rotation will cause a change in only one bit position. For example, from "1110" to "1100" or "1111", etc. Those of ordinary skill in the art will appreciate the mathematical exercise involved in generating the pattern. For a structure having the characteristics of the illustrative embodiment digital compass, there are hundreds of suitable possibilities. Another aspect of the emitter-detector location and shutter pattern design is the hidden needle concept. Because the magnetic needle is fixed to the shutter, and since the needle is ferrous and therefore opaque, the pattern must accommodate the presence of the needle. Accordingly, the specified shutter pattern must have an all-opaque portion at the needle position. The benefit of this aspect of the design process is to allow the maximum length needle to be employed, thereby maximizing the magnetic sensitivity of the system.

The light emitter selection process is dependent upon how the light signal data is gathered by the controller. Two sampling approaches may be used, sequential or simultaneous. With a sequential sampling approach, the controller activates one emitter-detector pair at a time and sequences through all available emitter-transmitter pairs to gather the detector output data. In the simultaneous approach, all of the emitter-detector pairs are activated at the same time. If the sequential sampling method is used, the emitter-detector locations can be freely chosen so long as the other design guidelines are fulfilled. If the simultaneous sampling method is used, then the emitter-detector pairs must separated far enough from one another so that the individual signals do not interfere with one anther. Note that after the emitter-detector pair locations are selected, there may be no available shutter pattern that meets the other criteria, especially the needle blocking criteria. In that case, the emitter-detector locations may need to be moved closer together and the patterns recalculated. A sampling of exemplar Paterson follows.

Figure 5A:
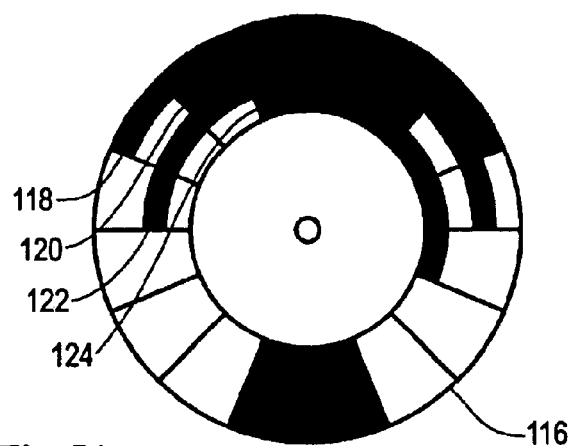
FIG. 5A is a drawing of a compass shutter wheel according to an illustrative embodiment of the present invention.
Figure 5B:
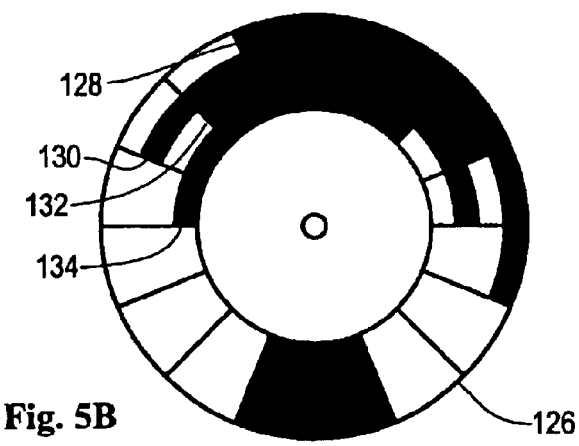
FIG. 5B is a drawing of a compass shutter wheel according to an illustrative embodiment of the present invention.
Figure 5C:
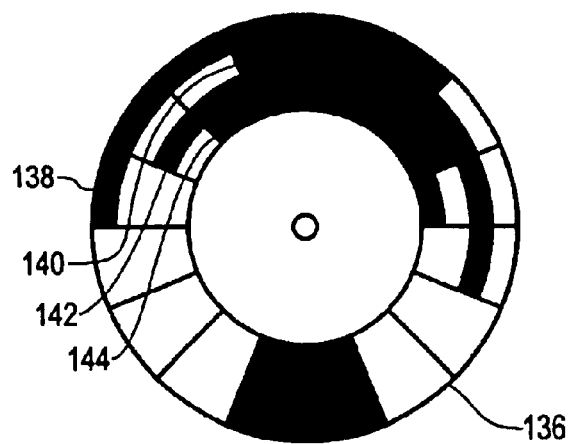
FIG. 5C is a drawing of a compass shutter wheel according to an illustrative embodiment of the present invention.

Reference is directed to FIG. 5A, FIG. 5B, and FIG. 5C, which are exemplary shutter patterns that meet the aforementioned criteria for the emitter-detector locations illustrated in FIG. 3. All of the shutter patterns include opaque covering for all four detectors in the lower two segments, satisfying the hidden needle requirement. FIG. 5A illustrates a shutter pattern 116 as described with respect to FIGS. 4(A–D). The four sensor arcs include patterns 118, 120, 122, and 14. FIG. 5B illustrates a shutter pattern 126 with the detector arcs adjusted, and includes patterns 128, 130, 132, and 134. FIG. 5C illustrates another shutter pattern 136, that includes arcs 138, 140, 142, and 144. All of these patterns satisfy the requirement that only a single data bit changes states as the pattern is rotated in whether direction about the compass circle.

Figure 6:
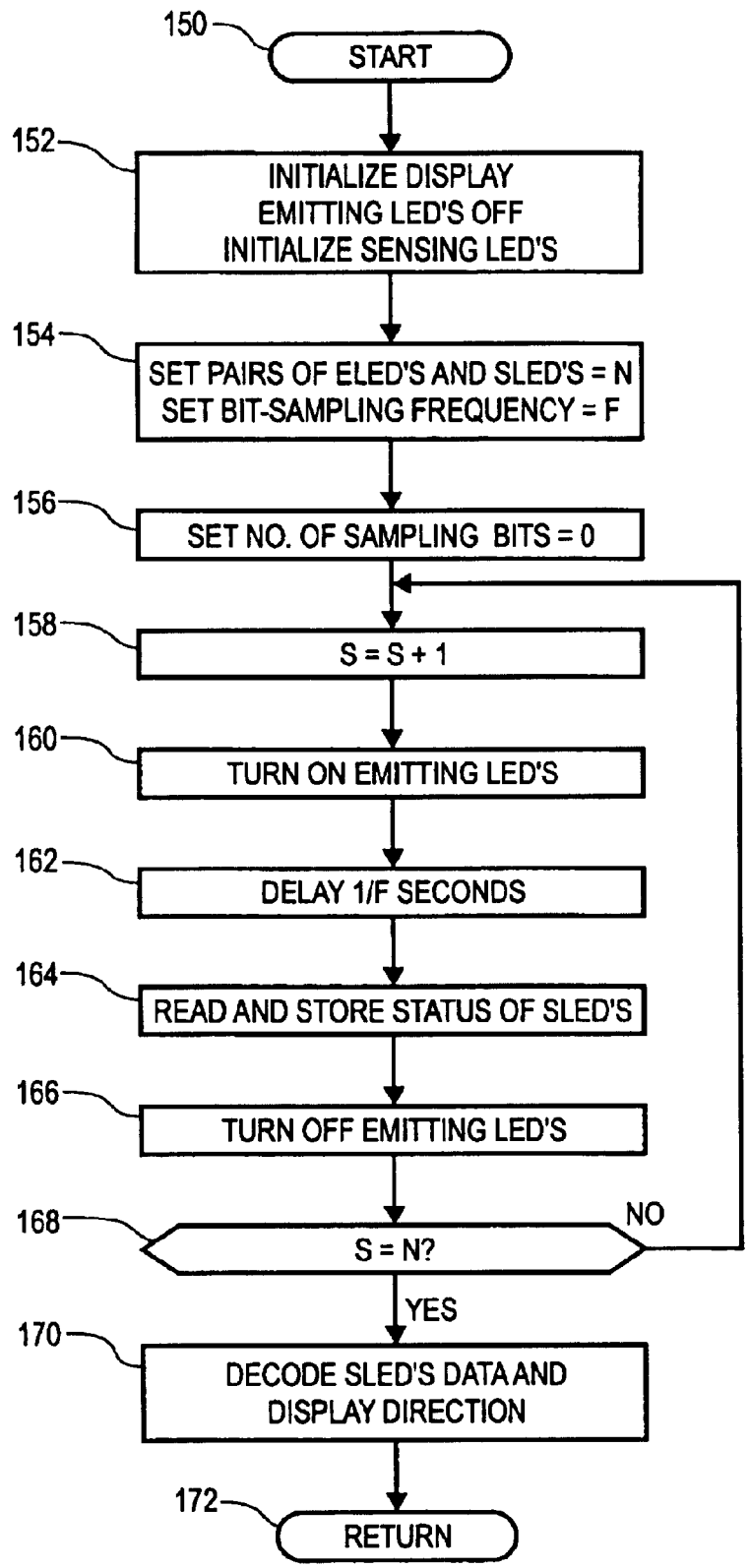
FIG. 6 is a flow diagram according to an illustrative embodiment of the present invention.

Reference is directed to FIG. 6, which is a flow diagram according to an illustrative embodiment of the present invention. FIG. 6 shows a software subroutine implementation of an illustrative embodiment. The subroutine is entered at step 150 and proceeds to step 152. At step 152, the liquid crystal display is initialized, all of the emitting light emitting diodes ("ELED's") are turned off, and the inputs for the sensing light emitting diodes ("SLED's") are cleared for the first data read operation. At step 154, depending on the resolution of this compass, the number of ELED's and SLED's pairs ("N") in the circuit is specified. In the illustrative embodiment, this number is four. Therefore, the resolution is four bits and a total of sixteen directions can be resolved. At step 154, the bit-sampling frequency ("F") is also set. The bit-sampling frequency has two functions. First, it determines how often the direction information is sampled and the display updated. Second, it provide enough time for the SLED output signals to go steady before being sampled by the controller. Having initialized these parameters, the controller sequences through the remaining steps in FIG. 6, which sample and display the direction information from time to time.

Each ELED and SLED are assigned an identity. These include ELED(1), ELED(2), ELED(3), and ELED(4), and correspondingly, SLED(1), SLED(2), SLED(3), and SLED(4). Physically, each ELED(S) is located opposite to corresponding SLED(S). At step 156, a counter establishes the index position ("S") of the bits sampling order and sequence to zero. At step 158, the counter is increment to the next bit position. In steps 160 and 162 the ELED's are turned on for 1/F seconds in time. The controller reads the output signal from the present SLED at step 164, and stores the state of that output. At step 166, the ELED's are turned off. The loop counter is tested at step 168 to determine if all the LED positions have been tested. If not, flow returns to step 158 where the counter is incremented. On the other hand, at step 168, if all the positions have been tested, flow continues to step 170. At step 170, the controller decodes and displays the direction information to the display. Finally, the subroutine returns at step 172. Note that the SLED's can be read individually or collectively. This will affect the direction information updating rate. For example, if all of the ELED are turned on at the same time and all of the SLED's statuses are recorded simultaneously, the updating duration can be reduced from N/F to 1/F. The sampling method can be changed to satisfy different application criteria.

Thus, the present invention has been described herein with reference to particular embodiments for particular applications. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for determining the orientation of Earth's magnetic pole, comprising:
   a needle magnet, pivotally coupled to a support and free to orient itself with Earth's magnetic pole;
   a shutter pattern fixed to pivot with said needle magnet, and wherein said needle magnet is positioned coplanar with, and constitutes a portion of, said shutter pattern;
   plural binary detectors, fixed relative to said support and aligned to detect said shutter pattern, having a binary word output signal indicative of the orientation of said magnet, and wherein
   said shutter pattern is formed and said plural binary detectors are positioned such that any incremental change in the orientation of said magnet will result in the change of state of no more than one of said plural binary detectors, and
   a display coupled to display an indication of the relative orientation of Earth's magnetic pole consistent with said output signal.

2. The apparatus of claim 1 wherein said plural binary detectors are optical detectors.

3. The apparatus of claim 1 wherein said plural binary detectors are optical pair detectors having a light emitter and a light sensor.

4. The apparatus of claim 1 wherein said shutter pattern includes a transmissive portion and an opaque portion.

5. The apparatus of claim 1 wherein said shutter pattern includes a reflective portion and an absorptive portion.

6. The apparatus of claim 1 wherein said shutter pattern is formed as plural arcuate portions, each concentric with said pivotal coupling, and each of said plural binary detectors lie along the arc proscribed by one of said plural arcuate portions.

7. The apparatus of claim 1 wherein said plural binary detectors each include a light emitter and a light sensor positioned on opposite sides of said shutter pattern.

8. The apparatus of claim 7, further comprising:
   an emitter blind positioned between said plurality of light emitters and said shutter pattern, and
   said emitter blind having a plurality of apertures formed therein, each aperture aligned with one of said plurality of light emitters.

9. The apparatus of claim 7, further comprising:
   a sensor blind positioned between said plurality of light sensors and said shutter pattern, and
   said sensor blind having a plurality of apertures formed therein, each aperture aligned with one of said plurality of light sensors.

10. The apparatus of claim 7 wherein said plurality of light emitters are light emitting diodes.

11. The apparatus of claim 7 wherein said plurality of light sensors are photo-diodes, photo-transistors, or light emitting diodes.

12. An electronic compass, comprising:
   a housing;
   a needle magnet, pivotally coupled to said housing and free to orient itself with Earth's magnetic pole;
   a shutter pattern fixed to said needle magnet, said shutter pattern form thereon as plural arcuate opaque portions, each concentric with said pivotal coupling, and a transmissive portion, and wherein said needle magnet is positioned coplanar with, and constitutes a portion of, said shutter pattern;
   plural light emitters and plural binary light sensor arranged as pairs fixed to said housing and on opposite sides of said shutter pattern, and wherein each of said pairs lie along one of the arcs proscribed by one of said plural arcuate portions, each of said plural binary light sensors having an output signal responsive to said optical pattern opaque portion or transmissive portion;
   an emitter blind positioned between said plurality of light emitters and said shutter, and having a plurality of apertures formed therein, each aperture align with one of said plurality of light emitters;
   a sensor blind positioned between said plurality of binary light sensors and said shutter, and having a plurality of apertures formed therein, each aperture align with one of said plurality of binary light sensors, and wherein
   said shutter pattern is formed and said plural binary light sensors are positioned such that any incremental change in the orientation of said magnet will result in the change of state of no more than one of said plural binary light sensors, and
   a display coupled to display an indication of the relative orientation of Earth's magnetic pole consistent with said output signals from said plural light sensors.

13. A method for determining the orientation Earth's magnetic pole with a device having a housing, a needle magnet that is pivotally coupled thereto, a shutter pattern fixed to pivot with the magnet, wherein the needle magnet is positioned coplanar with and constitutes a portion of the shutter pattern, plural binary detectors fixed relative to the housing, wherein the shutter pattern is formed and the plural binary detectors are positioned such that any incremental change in the orientation of the magnet will result in the change of state of no more than one of the plural binary detectors, and a display, comprising the steps of:
   orienting the magnetic poles of the magnet with Earth's magnetic poles;
   detecting the orientation of the magnet with respect to the housing by the plural binary detectors, and
   displaying an indication of the relative orientation of Earth's magnetic pole in accordance with the output of the detector.

14. The method of claim 13 wherein the binary detectors are optical detectors.

15. The method claim 13 wherein the shutter pattern is an optical pattern and the plural binary detectors include plural optical detectors, and wherein said detecting step further comprises the step of:
   determining the orientation of the magnet by reading the output state of the plural binary detectors.

16. The method of claim 15 wherein the optical pattern includes a transmissive portion and an opaque portion.

17. The method of claim 15 wherein the optical pattern includes a reflective portion and an absorptive portion.

18. The method of claim 15 wherein the optical pattern is formed as plural arcuate portions, each concentric with the pivotal coupling, and each of the plural optical detectors lie along an arc proscribed by one of the plural arcuate portions.

19. The method of claim 15 said determining step further includes the step of reading the output of the plural optical sensors simultaneously.

20. The method of claim 15 wherein said determining step further includes the step of reading the output of the plural optical sensors sequentially.

* * * * *